June 3, 1941.  A. G. DEAN  2,244,390

ARTICULATED RAIL CAR CONSTRUCTION

Filed Sept. 18, 1935  3 Sheets-Sheet 1

INVENTOR.
ALBERT G. DEAN.
BY
John P. Tarbox
ATTORNEY.

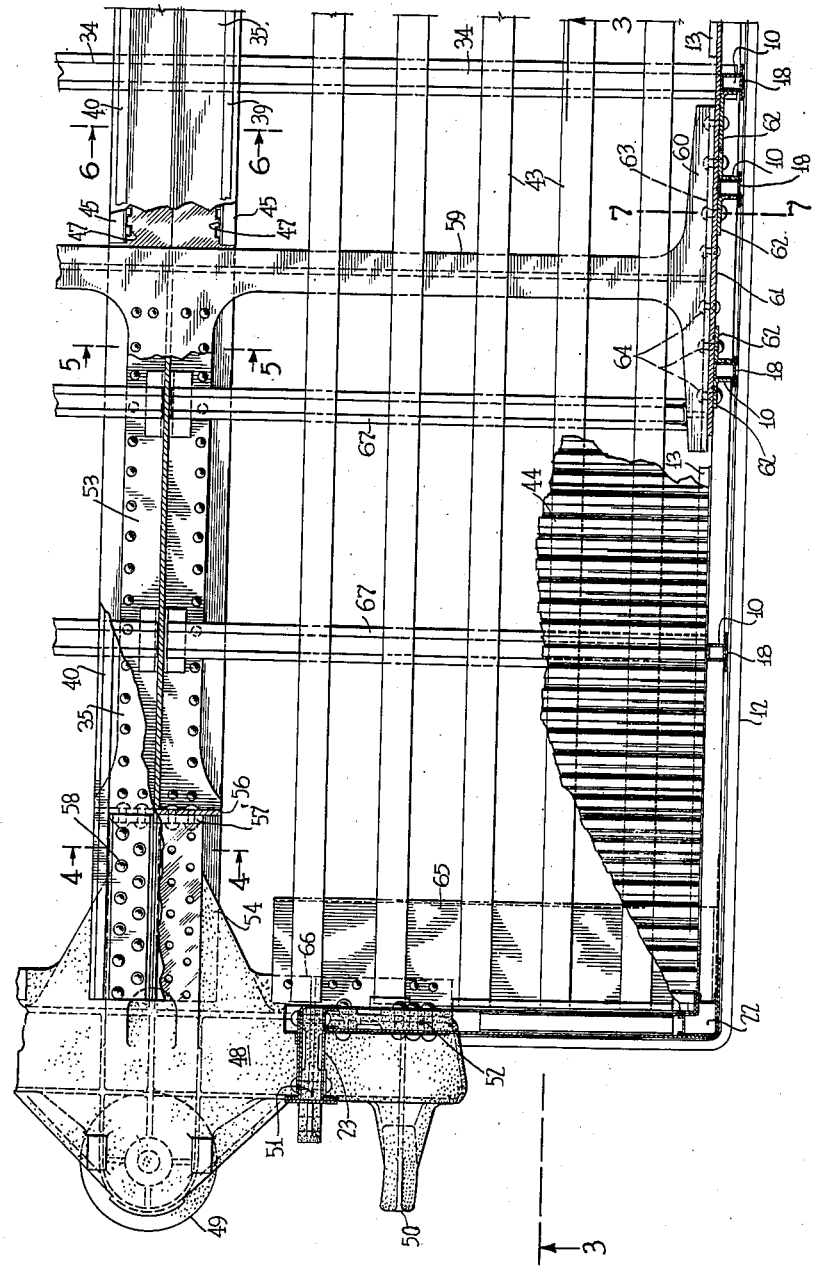

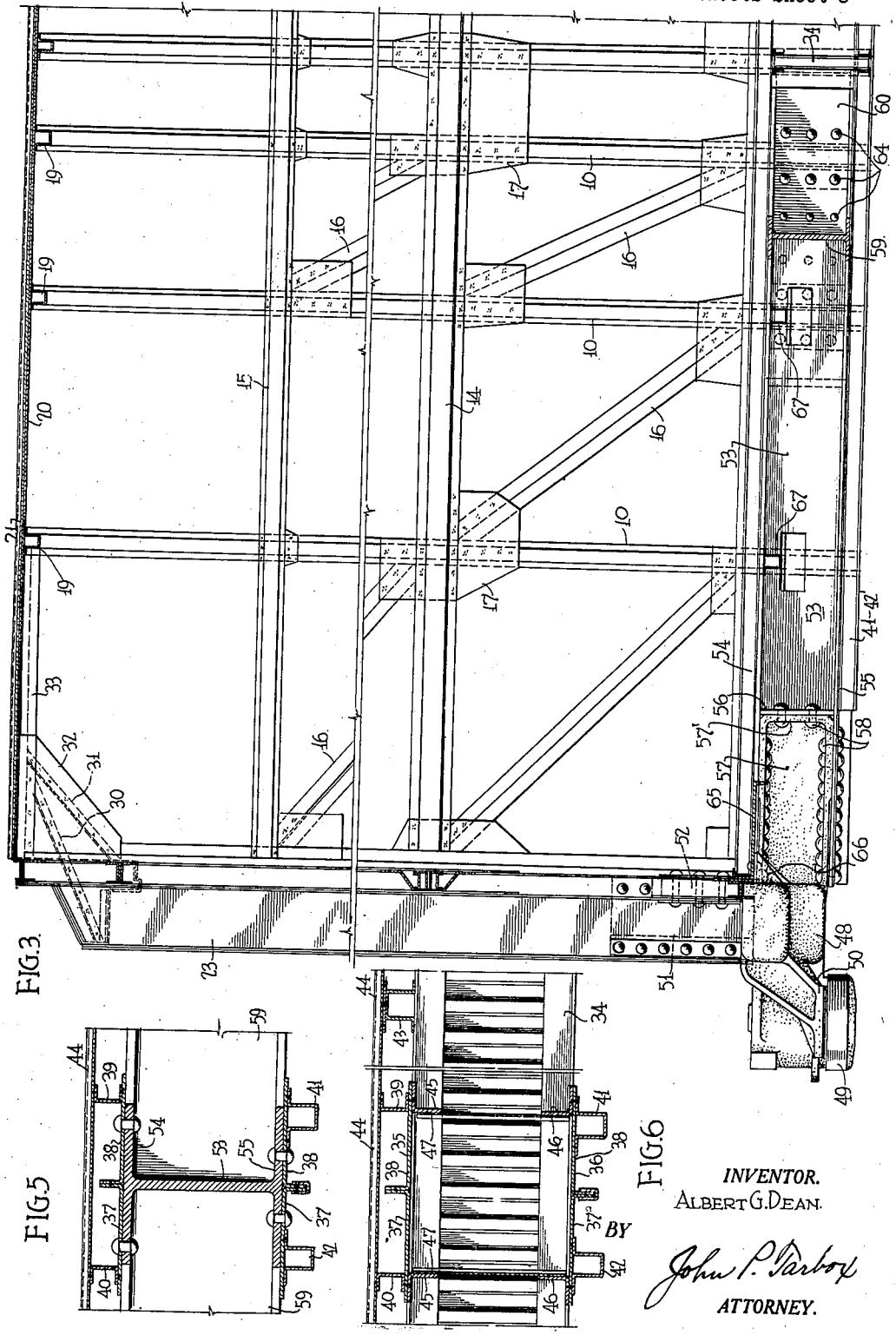

Patented June 3, 1941

2,244,390

UNITED STATES PATENT OFFICE 2,244,390

ARTICULATED RAIL CAR CONSTRUCTION

Albert G. Dean, Narberth, Pa., assignor to Edward G. Budd Manufacturing Company, Philadelphia, Pa., a corporation of Pennsylvania Application September 18, 1935, Serial No. 41,032

13 Claims. (Cl. 105—421)

The invention relates to rail cars, and more particularly to that class of rail cars known as articulated cars in which the adjacent ends of two car bodies are hinged to a common truck and on a common axis.

It is a particular object of my invention to improve the structure of the underframe and end walls of such car bodies as are built almost wholly out of light gauge metal trusses, fabricated out of strip stock, such as high tensile stainless steel stock, rolled or pressed into the cross sections desired and secured together by spot welding or the like. It is an aim of my invention to secure a wide dispersion of the concentrated loadings at the ends of the car body through the roof, side walls and bottom of the car body, thereby avoiding too great stressing of the light gauge truss structures and enabling them to take the distributed loading.

Other and further objects of the invention are the simplification of the structure and the arrangement of the joint structures so as to facilitate their assembly into the complete structure. Not the least of the objects is the provision of a rail car of this class having a maximum of strength to take the eccentric and longitudinal buffer loadings incident to car bodies of this class with a minimum of weight.

These objects and other and further objects which will become apparent as the description proceeds are attained in large degree by the construction now to be described in detail as shown in the accompanying drawings, in which Fig. 1 is an end elevation of a car body according to the invention.

Fig. 2 is a fragmentary plan view of the underframing, the side and end wall framing, parts of the flooring and center sill structure being broken away.

Fig. 3 is an enlarged vertical longitudinal sectional view taken substantially along the line 3—3 of Fig. 2, looking in the direction of the arrows.

Figure 4:
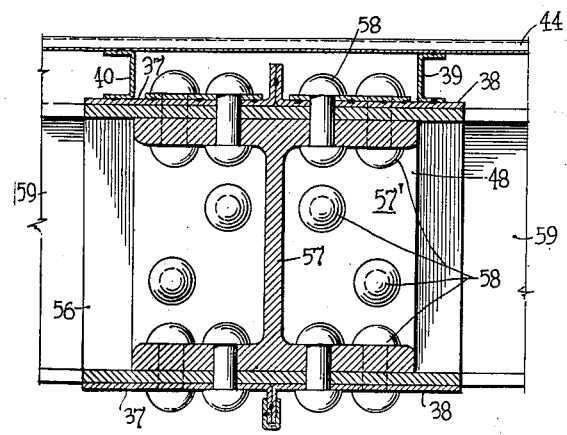

Figs. 4, 5 and 6 are fragmentary enlarged transverse sectional views taken, respectively, on the lines 4—4, 5—5 and 6—6 of Fig. 2 and looking in the direction of the arrows.

Figure 7:
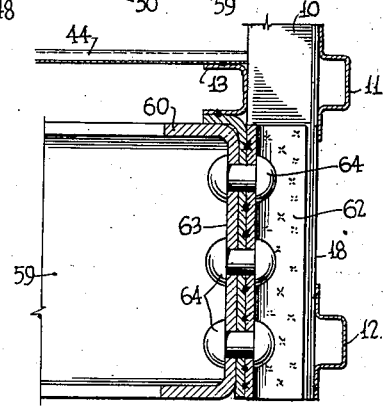

Fig. 7 is a fragmentary enlarged vertical transverse sectional view taken approximately on the line 7—7 of Fig. 2.

All of the sectional views of Figs. 4, 5, 6 and 7 show the flooring in place.

According to the invention the entire length of the side walls of the car, the entire length of the roof and the end walls of the car are fabricated out of very light gauge sheet metal stock. To attain the desired lightness of construction and at the same time insure adequate strength to carry the loading, the side, end and roof walls as well as the major portion of the underframe or floor structure are truss structures built up out of hollow section members of angle, channel or flanged channel form for the most part, and some of these channels are closed by cover plates to form box sections.

Figure 1:
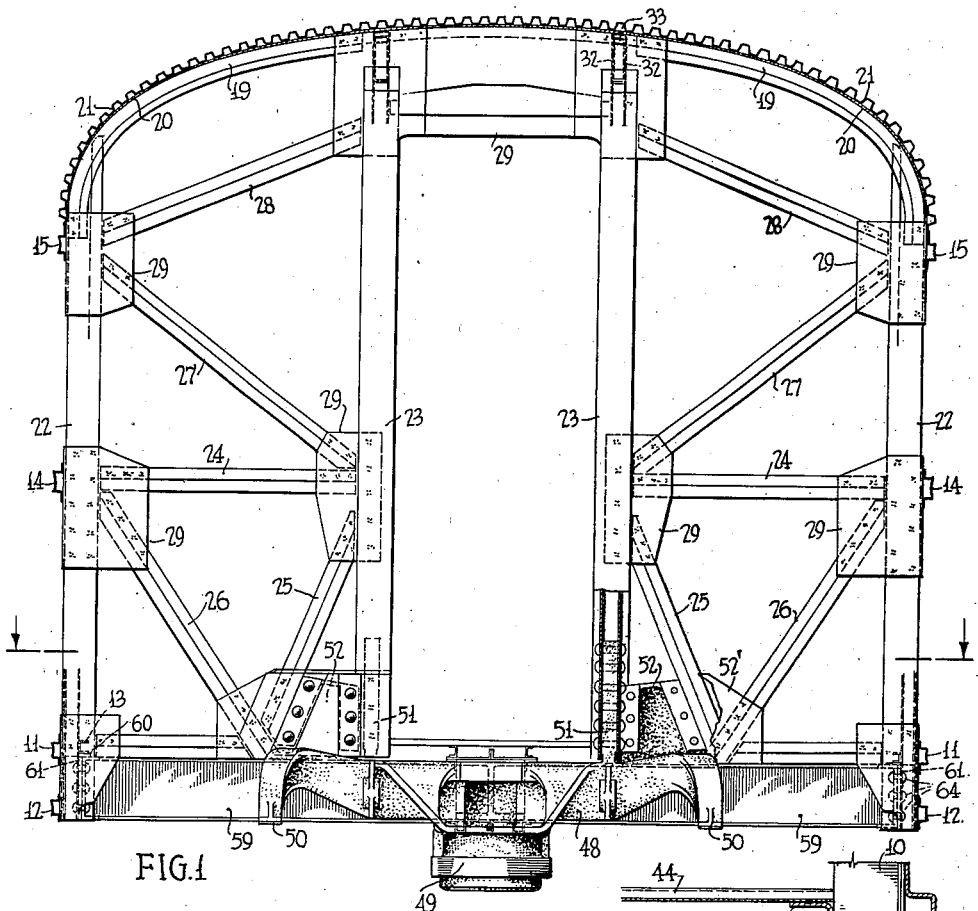

The side wall frames or trusses may comprise as shown in Figures 1 and 2, the spaced vertical post carlines 10 of outwardly facing flanged channel section, the flanged channel longitudinals 11 and 12 extending the length of the body, except at the doorway openings (not shown) where their place is taken by additional reinforcements, and interconnecting the bottoms of the post carlines, the inner laterally facing channel longitudinals 13 secured to the inner side walls of the posts opposite the longitudinal 11 as shown in Figure 7. These three longitudinals 11, 12 and 13, forming in effect, the lower or tension chord of the side wall trusses. The side trusses comprise also the upper or belt line longitudinal chord member, indicated by 14 in Figure 3, and the longitudinal 15 connecting the posts above the window openings just below the roof line. These vertical post members and the interconnecting longitudinal members are suitably united by diagonal trusses 16, each of which may comprise two channels secured through their bottom walls. These diagonal trusses may be arranged both in the region between the lower longitudinals 11 and the belt longitudinal 14 and in the region between the belt longitudinal 14 and the upper longitudinal 15 in the dead light spaces between the window openings. All of these parts are strongly joined together in the regions of inter-section by spot welding to the side walls or side wall flanges of the channels forming said members and through the provision of generous gussets as indicated at 17. As is clearly shown in Figure 2, the post carlines 10 are further reinforced by the closure plates 18 spot welded to the flanges of the side walls of the channels to form a box section structure.

The roof structure consists, like the side trusses, of transverse roof carlines 19 extending from one side frame to the other and connected to the tops of the posts 10. These carlines are also of outwardly facing flanged channel section and adjacent the ends of the car body and for some distance inwardly, they are connected together by a flat plate 20, the roof truss structure being completed by the longitudinal corrugated roof paneling 21 spot welded to the plate 20 and to the flanges of the roof carlines. The roof so constructed acts as a compression beam to take the compression loading through the roof.

At the ends, the side wall trusses and the roof truss are connected by transverse end trussing as clearly shown in Fig. 1. This trussing comprises the side corner posts 22 which the end trussing shares with the side frame trusses, the longitudinally very deep posts 23 at each side of the doorway opening through the end, the belt line transverse member 24 and the diagonals 25, 26, 27 and 28 all interconnecting each post 23 with an adjacent corner post 22. All these parts being strongly interconnected through the generous gussets 29, and spot welding as in the case of the side and roof structures.

The tops of the posts 23 are tied together in line with the inner ends of the diagonals 28 by transverse connections indicated generally at 29. The tops of the posts 23, which posts are of generally box section form and longitudinally of deep section to resist bending in a longitudinal plane, are tied in strongly by diagonal members 30 and 31 and gussets 32 into the longitudinal member or purline 33 extending from the front of the roof to the carline 19. Since both of the posts 23 are thus strongly braced into the roof structure, the eccentric loading upon these posts, as will presently appear, is distributed through an extensive area of the roof structure.

The underframe or flooring structure is also for the most part built up of the light gauge sheet metal stock of which the side, end and roof walls are constructed. It comprises a central buffer sill structure extending from end to end of the car and having top and bottom chords designated generally 35 and 36 and built up of a multiple number of angle and channel sections. The vertically deep transverse floor beams 34 also built up of light gauge stock into box section form having lateral flanges at top and bottom, are interleaved between the top and bottom chords 35 and 36 of the center sill and secured at their ends to the sides of the bottoms of the posts of the side wall trusses and at their central portions to the top and bottom chords of the center sill by spot welding.

For convenience of manufacture the top and bottom chords 35 and 36 of the center sill each comprise a relatively flat plate reinforced at its center by a laterally projecting flange and each is built up of two angles 37 and 38 having their long arms extending in the same plane and their short arms spot welded together and forming the lateral extending flange reinforcement. Adjacent their outer margins both the top and bottom chords are reinforced by channel members, the upper chord by the laterally facing channel members 39 and 40 forming longitudinally extending floor stringers, and the bottom chord by the flanged channel members 41 and 42 secured through their flanges to the flat plate portion of the chords. To complete the flooring structure the spaced floor stringers 43 extending from end to end of the car are secured, as by spot welding to the tops of the transverse floor beams 34 and the corrugated flooring 44 is spot welded to the stringers and to the channels 39 as well as to the channels 13 at the sides and forming parts of the side wall structures, and through these constructions the entire floor structure is converted into a girder for distributing the longitudinal buffer shocks throughout the floor area and into the side walls of the body.

In the spaces between the vertical deep transverse floor beams 34, the top and bottom chords 35 and 36 of the central buffer sill are interconnected by webbing. Such webbing consists, as shown in Fig. 6, of angle members 45 and 46 welded respectively along the edges of the top and bottom chords through one of their arms and a vertically corrugated web plate 47 welded to the other of their arms.

To maintain as light a construction as possible while yet enabling it to take the loads to which it is subject the end sill casting is made as light as possible and is tied in through a member intermediate in lightness into the very light gauge side end wall and underframe structures and this arrangement forms one of the principal features of the invention.

To this end the end sill casting 48 is made of very decidedly less transverse dimension than the width of the body and has projected from its central portion the eccentric center bearing 49 and from adjacent its ends the side bearings 50 and is tied in strongly with the longitudinally deep box section posts 23. The sill casting 48 is provided with upward extensions 51 which telescope within the posts 23 and are strongly secured thereto by a double line of rivets as clearly appears in Figs. 1 and 3. To further tie the end sill into the end wall trussing, the end sill is provided adjacent its ends with upward extensions 52 each extending in the plane of the end wall truss and between a post 23 and the adjacent diagonal 25 and secured strongly to said post and diagonal by overlapping gussets 52' to which the projections are riveted as clearly shown in Fig. 1.

These projections 51 and 52 are thus arranged in pairs on opposite sides of the doorway opening, the members of each pair being at substantially right angles to each other, which facilitates the machining operations.

The foregoing description points out the strong union between the end sill casting and the end wall truss structure and by reason of the vertical longitudinal joinder of the tops of the posts 23 into the roof structure, it will be seen that the eccentric loading upon the end sill is correspondingly distributed through the end frame structure and the roof.

It is desirable however to still further distribute the strongly concentrated loading upon the end sill into the flooring and side frame structures.

To this end a unitary member generally T-form in plan and fabricated out of a tough and high tensile steel alloy, such as a chromium manganese silicon alloy, extends the end sill inwardly for some distance from the end of the body and then outwardly by lateral extensions to the side walls of the body. This member designated generally by reference numeral 53 (see Fig. 2) is, in effect, a combined center or buffer sill and needle beam. This member is constructed substantially throughout I-section form, this form giving ready accessibility for welding the flat plates out of which the member is fabricated and provides edge flanges for the easy joinder of the member to parts overlapping these flanges. The gauge of the metal entering into this member is intermediate in thickness between that of the end sill casting, on the one hand, and the thin sheet metal truss structures forming the major portion of the body structure. At the front end the top and bottom plates 54, 55 of the member 53 are extended some distance beyond the web interconnecting them and at the point where the web ends, the top and bottom plates are connected by a transverse web 56. These extensions and the transverse web 56 together form a U-section recess within which a rearward extension 57, of I-section and having an inner end wall 57', (see Fig. 4), from the end sill telescopes and is strongly secured through the top and bottom extensions as well as the transverse web 56 by a plurality of rivets 58 as clearly shown in Figs. 2 and 3. To further increase the strength in this region the forward end of the intermediate member 53 is laterally widened. The transverse portion 59 of this intermediate member forms what is usually termed the needle beam and forms, in effect, the endmost of the deep transverse beams, as 34, connecting the side wall trusses. The ends of this beam are strongly connected into the side wall trusses in the manner now to be described.

At its ends the needle beam 59 is extended in fore and aft direction to form a wide base 60 which spans several posts 10 of the side frame trussing (see Fig. 2). Through the extent of this base 60 and for some distance rearwardly therebeyond as clearly appears in Fig. 2 a thick reinforcing plate 61 is spot welded to the bottoms of the channels of the posts 10 and further strongly secured to the side walls of the posts by angular members 62 having one of their arms spot welded to the side walls of the posts and through the other arm overlapping and spot welded to the plate 61. Plate 62 is further flanged inwardly at the top as shown in Fig. 7 and secured by spot welding to the longitudinal channel 13 interconnecting the posts.

Finally angles 62, plate 61 and the overlapping lateral face 63 of the base 60 are all strongly secured together by a plurality of vertical rows of rivets 64, see Figs. 3 and 7, thereby tying the needle beam strongly to both the vertical and longitudinal members of the side wall trusses.

The top and bottom chords 35 and 36 with their reinforcing channels are extended finally to overlap the top and bottom plates 54 and 55 of the center sill section of the intermediate member 53 connecting the side frames and the end sill casting and are strongly secured thereto by a double line of rivets such as clearly shown in Fig. 2, thereby strongly reinforcing the center sill between the needle beam and the end casting and also tying the intermediate member 53 into the light gauge buffer sill extending inwardly of the needle beams.

Not only do the chords extend in overlapping relation with the intermediate member but they also extend in overlapping relation with the rearward extension 57 of the casting 48 and are secured thereto through the same set of rivets 58 which secure the intermediate member 53 to the casting. As shown in Fig. 3, the bottom channels 41 and 42 terminate at the rear end of the casting extension 57.

By this construction the heavy eccentric and buffer loads concentrated at the point of support of the end sill through its center bearing are transmitted through successive members of increasing lightness until they are spread out through substantially the entire side wall, roof, end wall, and floor structure trussing. The eccentric loading is partly transmitted through the posts 23 into the roof truss and partly through the intermediate member 53 into the side frame trusses. Longitudinal buffer and draft loadings are transmitted through the member 53 into the underframe and side wall trusses. In this way no excessive bending moments are exerted upon any portion of the light gauge truss structures which form the main body of the car.

Some of the buffer loads are also carried directly into the underframe and side wall truss through the lateral extensions of the end sill castings now to be described.

To extend the short lateral extensions of the end sill laterally to the end of the side wall of the car body, a longitudinally deep Z section plate 65 is riveted as shown in Figs. 2 and 3 to a rearwardly extending ledge 66 provided on the lateral extending arm of the end sill casting. This plate supports the forward ends of the floor stringers 43 which are secured to it and through the floor stringers and flooring provides further means through which the shocks upon the end sill casting are distributed throughout the body structure. The flooring stringers between the needle beam 59 and the end of the body are further supported by light transverse beams 67 extending between and secured to the center sill and the side frames, (see Figs. 2 and 3).

Inwardly beyond the needle beam the center sill structure is not calculated to carry any substantial bending load since the webbing between the transverse floor beams 34 is interrupted. However, the chords 35 and 36 of multiple angle section form stiff columnar structures extending from one end of the car to the other and are prevented from lateral bending due to their joinder at numerous points to the transverse floor beams. Hence, this portion of the center sill is well adapted to transmit longitudinal buffing shocks, even if not designed to carry any substantial vertical bending load, the vertical load being taken principally by the side wall trusses and the transverse floor beams interconnecting the lower ends thereof.

The foregoing detailed description sets forth a preferred form which the invention may take, but it should be understood that changes and modifications may be made departing from the detailed structure while still maintaining the advantages, or many of them, inherent in the specific construction set forth. All such changes and modifications as would readily occur to one skilled in this art are contemplated as falling within the spirit of the invention and within the spirit and scope of the appended claims.

Reference is made herein to my earlier copending application Serial No. 720,489 for End construction for rail cars, filed April 13, 1934, and disclosing subject matter common to certain of the subject matter disclosed herein, the broad common subject matter being claimed in said earlier application.

What I claim is:

1. In a light weight rail car construction, an end sill casting subject to longitudinal and eccentric vertical loads and having a central inward extension, a unitary member of lighter construction than said end sill forming the end portion of a center sill and a transversely extending needle beam, the outer end of said unitary member tying into the inward extension of said end sill casting, the ends of said needle beam being laterally widened and secured through said widened portions to side wall trusses of still lighter construction, said side wall trusses absorbing end sill bending and longitudinal stress reactions, said center sill absorbing longitudinal stress reactions only.

2. In a light weight rail car construction, an end sill casting having a central rearward extension, a unitary member of lighter construction than said end sill forming the end portion of a center sill and a transversely extending needle beam, the outer end of said member tying into the rearward extension of said end sill casting, and a trussed center sill of still lighter construction extending inwardly from said needle beam, the top and bottom chords of said center sill being extended over the center sill portion of said unitary member and secured thereto.

3. In a light weight rail car construction, an end sill casting having a central rearward extension, a unitary member of lighter construction than said end sill forming the end portion of a center sill and a transversely extending needle beam, the outer end of said member tying into the rearward extension of said end sill casting and the ends of said needle beam being laterally widened and secured through said widened portions to side wall trusses of still lighter construction, the center sill inwardly beyond said needle beam being likewise fabricated of light construction and having its chords extended outwardly over said center sill portion of the unitary member and secured thereto.

4. In a light weight rail car construction, an end sill casting having a central inward extension, a needle beam having a forward extension and secured through said forward extension to the end sill casting, the needle beam being tied at its ends into the side wall truss structure, the joint between the end of the needle beam and the side wall truss structure comprising a heavy gauge plate interconnecting a multiple number of posts of the side wall truss structure, said needle beam having a widened end strongly secured to said plate and to the vertical posts of the side frame truss.

5. In a light weight rail car body, side frame trusses, end sill castings, and a light gauge center sill extending throughout the length of the body and designed primarily for longitudinally directed loadings, said end sill casting being subject to torsional loading, the end portions of said center sill being connected to the end sill castings through an intermediate member designed to carry the vertical components of the torsional loading and a portion of the longitudinal loading into the side frame trusses of the body.

6. In a light weight rail car construction an end sill casting terminating a substantial distance inwardly of the body side and a sheet metal extension of said casting secured to a rearwardly extending ledge thereon carrying it out to the side wall, said extension supporting the flooring structure, and being rigid in a horizontal plane to transmit shocks from the end sill to the side walls.

7. In a light weight rail car, a central eccentrically supported end sill casting upon which the loads are concentrated, and light weight body side wall and roof trusses, and means extending in the plane of the underframe and connected thereto and further connecting the end sill casting to the side wall truss and further means extending in the plane of the end wall for connecting the end sill casting to the roof truss, whereby longitudinal buffer shocks are directly carried into the underframe and through it into the side frames and the reactions of the eccentric loading are shared by the side frame trusses and roof truss.

8. In a light weight rail car construction, an end sill having an eccentric bearing, and an inward extension, said end sill being subject to torsion, light weight side wall trusses, and a unitary member of a gauge intermediate the gauge of the metal entering into the side wall trusses and the end sill, said unitary member being rigidly secured to the inward extension of the end sill and through a longitudinally widened connection, to the side wall trusses and functioning to distribute the concentrated loading upon the end sill through the side wall trusses.

9. In a light weight rail car construction, an end sill casting having an eccentric bearing, light weight side wall trusses including vertical posts and longitudinal members and an elongate plate reinforcement bridging a plurality of said posts and secured thereto, and a member intermediate in gauge between said end sill casting and the light weight side trusses secured to said end sill and to the elongate plate reinforcement of said side wall trusses, whereby to transmit and distribute the concentrated loading on the end sill casting into the side wall trusses.

10. In a rail car body for articulated trains, an eccentrically loaded end sill of a width substantially less than the width of the body, said end sill having an articulated connection member tending to set up torsion therein in combination with a unitary member of lighter construction than said end sill connected thereto and extending some distance inwardly of the body, and then extending laterally from its inner end to the side walls of the body for connection thereto, and transmitting end shocks from the end sill casting to the body side walls.

11. In a light weight rail car construction having side and roof trusses, the roof truss being a compression member, the combination of an end sill projecting from the end of the car and serving as an articulated coupling, a center sill of light gauge sheet metal including angular cross section webs and chord members, and a stress distributing member secured to the end sill and center sill, said member having a plurality of transverse members extending to and interconnecting portions of the side trusses and adapted to partially counteract the eccentric loading on the end sill, and means extending to the roof from said end sill to complete the resistance to the eccentric loading reactions of said end sill.

12. In an articulated light-weight rail car construction, an end sill member having an eccentric mounting projecting therefrom whereby the sill member is subject to torsion, a center sill connected to the end sill member and being reinforced for some distance inwardly from the end sill member by a T-form reinforcement the stem of which forms part of the center sill structure and the arms of which extend laterally to the side wall structures of the car for securement thereto, said center sill in this reinforced region being arranged to take both bending and buffing and draft loads and transmit some of said loading into the side wall structures, the center sill for the remainder of its length having sheet metal chord members of angular cross section and vertical sheet metal webs and being designed primarily to take buffing and draft loads as distinguished from bending loads.

13. In a light-weight rail car, a unitary member generally T-form in plan, an end sill member subject to torsion having a rearward extension secured to the stem of said T-form member and a forwardly extending eccentric mounting portion for supporting the car on a truck, the lateral arms of the T extending to the side walls of the body, a longitudinally wide connection between the ends of the lateral arms and the side wall whereby bending moments may be transmitted to the side walls, said unitary member having its stem secured to a central buffer sill extending the length of the body.

ALBERT G. DEAN.